June 8, 1926.
G. B. VARNUM
LOCK
Filed April 1, 1924   3 Sheets-Sheet 1
1,587,686
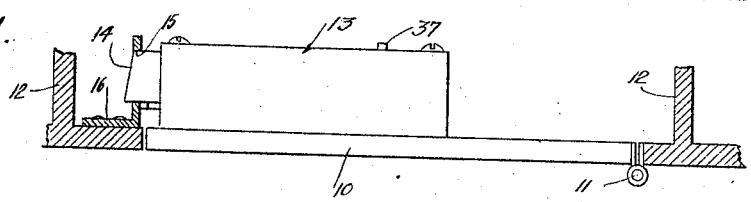
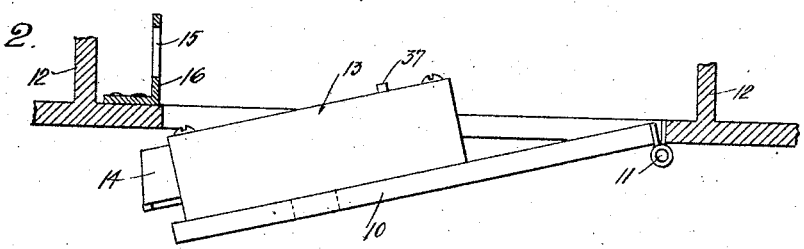
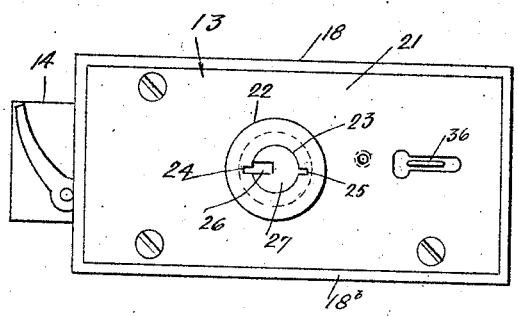
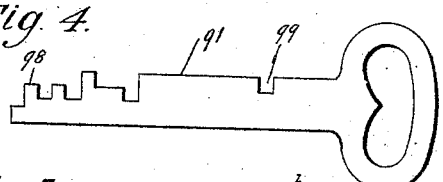
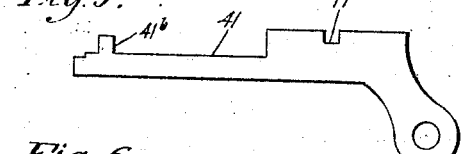
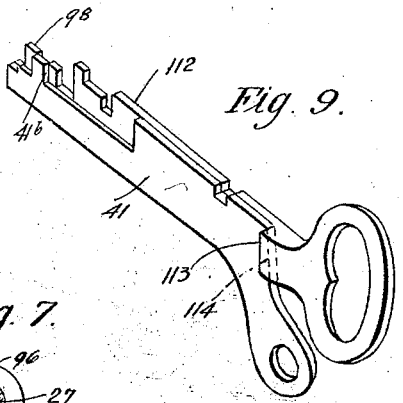
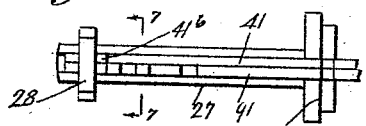
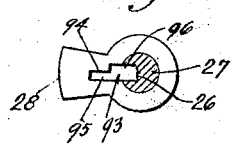
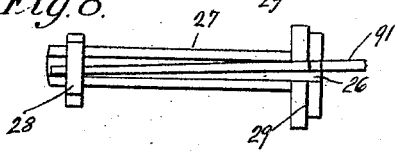
Inventor.
George B. Varnum.
his Attorney.

June 8, 1926.

G. B. VARNUM

LOCK

Filed April 1, 1924

Inventor.
George B. Varnum
his Attorney

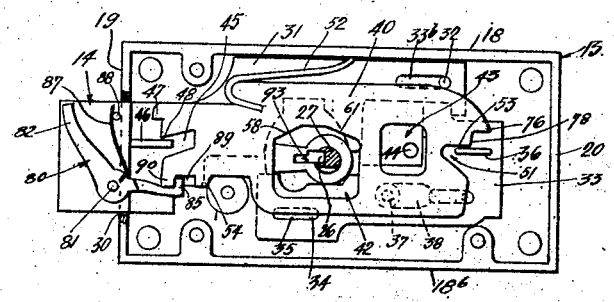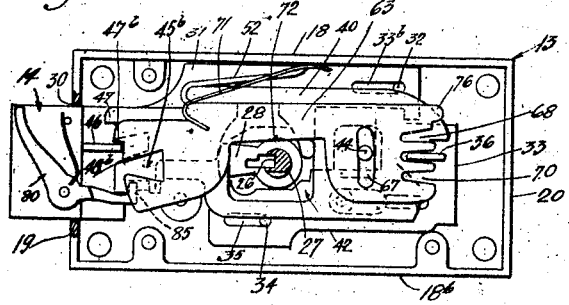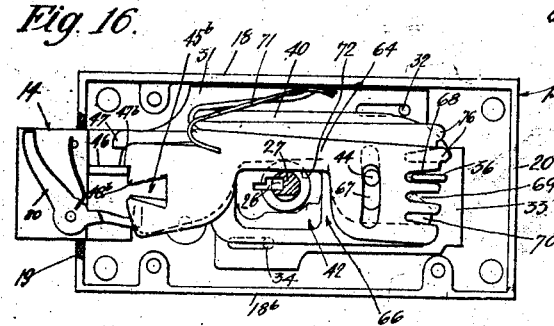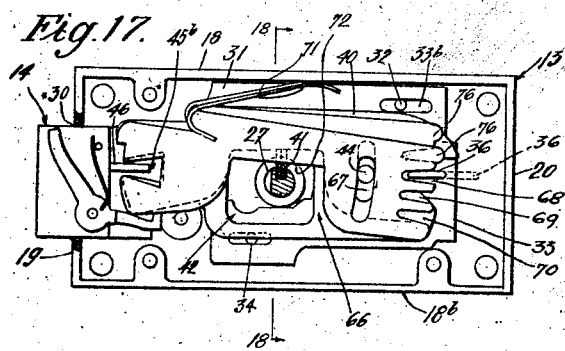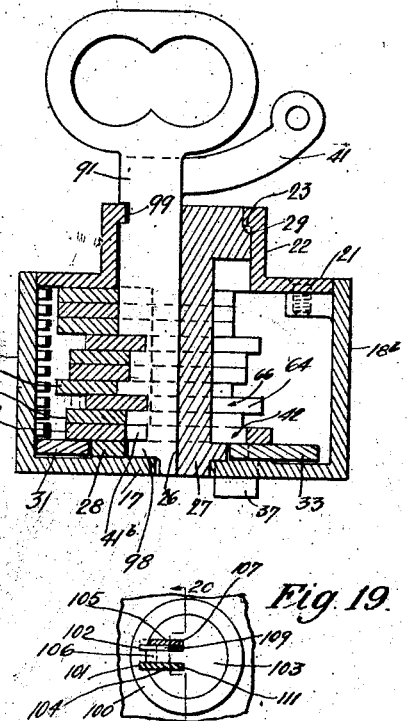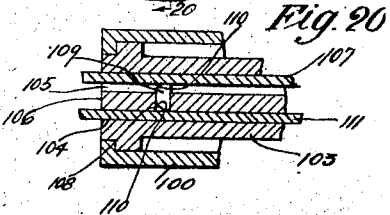

Patented June 8, 1926.

1,587,686

UNITED STATES PATENT OFFICE.

GEORGE B. VARNUM, OF LOS ANGELES, CALIFORNIA.

LOCK.

Application filed April 1, 1924. Serial No. 703,527.

This invention relates generally to locks and more particularly to locks adapted for use in connection with safe deposit compartment doors where two keys are required to actuate the bolt mechanism, one key being in the possession of the renter and the other held by the custodian or guard of the vault.

As one of the features of my invention, after the lock has been actuated to allow the compartment door to be opened, the renter's key must be removed from the key post before the guard key may be withdrawn; it being possible, however, for the renter subsequently to reinsert his key and shoot the bolt home without requiring insertion of the guard key. While the door is open the renter may throw the bolt in either direction by the sole use of his key, but when the door has been closed and the renter's key has been used to shoot the bolt home to lock the door, joint key application is again necessary to reopen the door. The guard key, by itself, is incompetent to lock the door.

While the advantages of this system are many, I need mention but a few of the more outstanding. For obvious reasons it is highly desirable, both to the vault proprietor and to the renter, that the renter's key never be left in the lock except in the presence of the renter, although it is often a temptation so to leave it. Since the guard cannot withdraw his key until the renter's key is withdrawn, the withdrawal of the customer's key, in the presence of the guard, is forced, for the guard dare not leave his post at the compartment except when the guard key is actually in his possession.

Since the guard key, by itself, is incompetent to relock the door, the renter is obliged to perform this task himself, and since only the tumblers of his particular compartment lock are responsive to his key, there is no liability of the renter locking his bond box in any compartment other than his own. Once the door is open, the keys cannot be withdrawn, either singly or jointly, until the bolt has been thrown to extended position, so, until the renter finally locks the door, the door must either be open with the lock bolt extended or the renter's key must be in the lock. Either of these circumstances gives obvious notice of the condition of that particular box, and calls for immediate remedy in case the renter inadvertently or purposely leaves the premises without fulfilling his duty.

Many of these features are disclosed in United States Patent No. 1,439,042 to Varnum, et al., but they are there shown embodied in a lock of the "two nose" type. The present invention is concerned with the application of these features to a single nose, two key lock, such application involving certain distinct and novel differences over the structure disclosed in the issued patent.

As a further feature, my invention may be applied to an "interchangeable key lock", that is, a lock wherein the tumblers may be automatically set up to form proper combinations by the mere insertion and actuation of any key of a given series. This is in distinction to locks wherein it is first necessary to change the tumbler combination and then file a key to fit that particular combination, or where it is necessary to disassemble the lock and fit differently formed tumblers to a given key. By reason of my provision and arrangement of certain elements, it is absolutely necessary that the guard key be operated jointly and simultaneously with the main or renter's key when a new combination is set up. This forestalls the possibility of the guard key being first used to set up the guard tumbler and being then withdrawn to leave the lock in such condition that a second party may set the combination to a main key in his possession, either accidentally or with fraudulent purpose. This is a feature of great value as has been proven by the fact that interchangeable key locks, without my safeguard, have actually been so manipulated, with aggravating and harmful results.

Other features of novelty and objects of the invention will be set forth in the following detailed description, reference being had to the accompanying drawings in which:

Figure 1 is a horizontal sectional view of the forward wall of a safety deposit compartment, showing, in elevation, the compartment door and lock embodying my invention.

Fig. 2 is a view similar to Fig. 1, but showing the door in open position and with the bolt in extended position.

Fig. 3 is a front face view of the lock as it appears when detached from the door.

Fig. 4 shows a typical "renter's key".

Fig. 5 shows a typical "guard key".

Fig. 6 is a detached view of the key post making up a part of the lock and illustrating the position the keys occupy with respect to the key post when said keys are fully inserted. The key post is viewed from such a position that the upper or ward edges of the keys are presented to the eye.

Fig. 7 is a section on line 7—7 of Fig. 6 but with the keys omitted.

Fig. 8 is a view similar to Fig. 6 but showing the renter's key, only, as being inserted in the lock.

Fig. 9 is a perspective view of a modified form of main key associated with a typical guard key.

Fig. 14 is a view similar to Fig. 13 but showing the bolt extended and free of the jamb or keeper.

Fig. 15 is a view similar to Fig. 14 but showing one of the main tumblers in place.

Fig. 16 is a view similar to Fig. 15 but showing an additional main tumbler in place.

Fig. 17 is a view similar to Fig. 16 but showing the bolt partially retracted.

Fig. 18 is an enlarged section on line 18—18 of Fig. 17 showing the cover plate and nose in place.

Fig. 19 is a fragmentary elevation of a lock with a modified form of key post; and Fig. 20 is an enlarged section on line 20—20 of Fig. 19.

Figure 10:
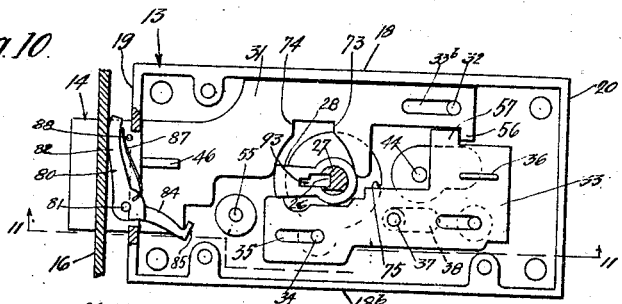
Fig. 10 is a view of the lock with cover plate and all tumblers removed.

At the outset, I wish to make it clear that while I will describe my invention as applied to a particular type of lock—that is, a dead-bolt, flat and interchangeable key lock—this is done for purposes of description only, and is not to be construed as limiting the invention to its application to any specific type of lock. It will be well understood that the invention, in its broader aspects, may be equally advantageously embodied in a pin-tumbler, corrugated key lock, or to a lock used in connection with doors other than for safety-deposit compartments.

The invention is of such a nature that it may be best explained by first describing the construction and operation of a typical lock before application of my improvements. Thereupon the purpose and advantageous features of the invention may be more clearly and concisely set forth. I will find occasion to point out certain shortcomings of locks which have gone before, but this is not done for the purpose of derogation, but merely to enable me to clearly set forth my reasons for providing certain elements and actions whereby I am able to produce a superior lock in that it meets certain contingencies not successfully met in the past, so far as I am aware.

First referring to Figure 1, the numeral 10 designates a door hinged at 11 to one side of compartment casing 12. The bolt mechanism is contained within a casing 13 secured to door 10, and the main bolt 14 of the lock is adapted to engage the usual slot 15 in keeper 16, the latter being secured to casing 12 in the usual manner. Casing 13 is of box-like structure, having bottom plate 17, side walls 18 and 18ᵇ and front and rear end walls 19 and 20. A cover plate 21 overlies the bolt mechanism and is provided with the usual tubular extension 22 which is adapted to project through door 10 whereby it is accessible from outside the compartment. Extension 22 is known in the art as a "nose" and has an internal peripheral flange 23 which is notched at 24 and 25 (in the present instance, said notches being diametrically opposed) whereby actuating keys may be admitted to slot 26 in key post 27 only when said key post is in predetermined relative position with respect to said nose. Post 27 is mounted for rotation within nose 22 in the usual manner, key post cam 28 coacting with wall 17 and head shoulder 29 coacting with nose flange 23 in a manner to prevent longitudinal movement of the post.

Bolt 14 extends through a suitable aperture 30 in casing wall 19, and terminates in a tail piece 31 bearing on casing wall 17 and limited in its longitudinal movement by casing pin 32 which projects through slots 33ᵇ in said tail piece. A slide plate 33 also bears on wall 17, and it is guided and limited in its longitudinal movement by casing pins 34 which extend through plate slots 35. A rack post 36, of staple-like formation is mounted on and carried by plate 33, the plate being adapted to be manually moved to the right in Fig. 10, under certain conditions, by a pin 37 which extends through a slot 38 in casing wall 17, and is therefore accessible only when the door is open. Normally, plate 33 is in the position of Figure 10, that is, at the limit of its movement to the left as viewed in this figure.

When bolt 14 is fully extended, key post cam 28 is in the position of Figure 10 and key post slot 26 is in register with nose notch 24. Immediately overlying and bearing on tail piece 31 and slide plate 33 is a guard tumbler 40 which is responsive only to guard key 41. Tumbler 40 has a central aperture 42 to accommodate key post 27, and an aperture 43 to accommodate positioning pin 44, aperture 43 being of sufficient size and being so located that there is clearance between all of its defining walls with respect to pin 44 when the guard tumbler is in the position of Figure 12. At the forward end of tumbler 40 is a notch 45 adapted to receive bolt stump 46 when said stump and notch are in alinement. The extreme forward end of the guard tumbler has a locking nose 47 and a riding nose 48, the lower shoulder 49 of nose 47 is adapted to bear on top stump 46, and the forward shoulder 50 of nose 48 bears against the rear edge of stump 46 when the bolt is fully extended and the door closed. The rearward end of tumbler 40 is provided with a notch 51 adapted to receive racking post 36, and a spring 52 acts between tumbler 40 and casing wall 18 in a manner to move tumbler 40 towards the opposite side wall 18$^b$ and thus maintains nose shoulder 49 and shoulder 53 (defining the top of notch 51) in contact with the tops of stump 46 and racking post 36, respectively. With the guard tumbler in this position tumbler lug 54 engages a stop pin 55 which extends upwardly from casing wall 17. Thus, since tumbler 40 is held from movement to the right, in Figure 12, by the engagement of lug 54 with pin 55, retractive movement of bolt 14 is prevented due to the engagement of stump 46 with shoulder 50; and in order to allow bolt retraction tumbler 40 must be rotated about post 36 as a pivot until tumbler notch 45 registers with stump 46. When swung to this position, tumbler lug 54 clears pin 55. With tumbler 40 in the position of Figure 12 and with lug 54 in engagement with pin 55 to prevent retraction of the tumbler and bolt, lug 56 on tail piece 31 engages lug 57 on slide plate 33 to maintain said plate against longitudinal movement to the right in this figure and therefore retains racking post 36 within tumbler notch 51. Only when the tumbler is raised from engagement with pin 55 may slide plate 33 be moved to the right by manipulation of pin 37, and such manipulation occurs only during a combination change.

The upper defining wall of tumbler aperture 42 is of such outline that it provides oppositely inclined cam faces 58 and 61 with a horizontal face 79 extending therebetween. When guard key 41 is entered in the key post, and turned in a clockwise direction to bring it into the position of Fig. 13, key ward 41$^b$, which extends into tumbler aperture 42, is brought into engagement with cam face 58, swinging tumbler 40 in a clockwise direction about racking post 36 as a center and bringing notch 45 into alinement with bolt stump 46, ward 41$^b$ thence moving beneath face 79 to hold the tumbler in raised position. Subsequent counterclockwise rotation of key 41 allows spring 52 to return tumbler 40 to locking position.

It will be noted that guard key 41, by itself, is incompetent to impart longitudinal movement to the guard tumbler, and, therefore, the guard or holder of key 41, without the main key, is unable to shift the guard tumbler either to right or left to hold it in unlocked or "clear" position. This is in contra-distinction to the usual lock mechanism, wherein rotation of the guard key in one direction lifts the tumbler to bring its notch into alinement with the bolt stump, and subsequent rotation of the guard key in the opposite direction moves the tumbler longitudinally into such position that the tumbler notch remains in alinement with the bolt stump after the guard key has been withdrawn.

In order to insure that the frictional engagement between guard key and guard tumbler may not cause a longitudinal shift of the tumbler when the key is rotated, I prefer to enter the end of spring 52 in casing notch 92 (Figs. 12 and 13) out of which notch the spring end may ride when the guard tumbler is positively moved longitudinally by means other than the guard key, as will hereinafter be described.

It is also obvious that movement of the guard key, alone, cannot cause bolt retraction since, as is usual to locks of this type, the main tumblers, to be described, cannot be thrown to release or clear position by the guard key.

The main tumblers 63, 64 and 65 may be provided in any suitable number and their forward ends are fashioned after the manner of the forward end of the guard tumbler except that the stump receiving notches 45$^b$ are of sufficient length to allow stump 46 full longitudinal movement without imparting like movement to the main tumblers. Each main tumbler is provided with a notch 66 to receive the key post and all main tumblers are held against longitudinal movement by reason of the positioning pin 44 which extends upwardly through the arcuate tumbler slots 67, the latter being struck about riding noses 48$^b$ as centers. The rearward end of each main tumbler is serrated to provide combination notches 68, 69 and 70, in any suitable number, and depending upon the combination, one of these notches in each main tumbler is adapted to receive racking post 36. The combination notches extend radially from noses 48$^b$ as centers. Springs 71 are adapted to yieldably hold the main tumblers so their locking noses 47$^b$ are in locking engagement with the bolt stump, and it is obvious that depending upon the particular combination notch entered by post 36, the distance of tumbler shoulders 72 from key post 27 may be varied, thus calling for main key wards of different heights in order that, when the main key is inserted and initially rotated in a clockwise direction, its wards may engage shoulders 72 in a manner to rotate or raise each tumbler so its notch 45^b comes into proper alinement with stump 46. Continued rotation of the key post by the main key throws key post cam 28 into engagement with shoulder 73 on tail piece 31 and causes retraction of the bolt, provided, of course, guard tumbler 40 is held in clear position, a position to which it can be put only by use of the guard key, and the guard key must be operated simultaneously with the main key in order that the guard tumbler be cleared at the same time as the main tumblers. Subsequent counter-clockwise movement of key post 27 by the main key swings cam 28 into contact with shoulder 74 of tail piece 31, which throws the bolt to extended position, draws stump 46 from out notches 45^b, under certain conditions allowing the main tumblers to drop back into locking position, and also allowing the guard tumbler to return to locking position.

Shoulder 75 on slide plate 33 normally limits the rotation of key post cam 28, and hence key post 27 and the main key to less than 180°, and therefore the key post cannot normally be rotated in a clockwise direction sufficiently to allow withdrawal of the keys through nose notch 25, requiring that the bolt be shot to extended position by counter-clockwise movement of the key post before the keys may be withdrawn. I have shown above that it is necessary, when unlocking the door that the guard and main key be operated jointly and simultaneously, and I will now describe the means making it possible to relock the door by using the renter's or main key alone, it also being impossible to move the bolt in either direction by the main key, alone, as long as the door is open.

Generally, I accomplish this by moving the guard tumbler longitudinally so as to hold it in unlocked or clear position, the movement being brought about by movement of the main bolt and its associated parts (rather than by movement of the guard key, as is true of usual locks of this type). I utilize an auxiliary bolt for setting up this longitudinal movement of the guard tumbler, and since the actuation of the auxiliary bolt depends upon circumstances which can only be controlled by movement of the main key or the main bolt 14, it will be seen that the renter's key must be in the lock before the guard tumbler may be moved to hold it in unlocked position. However, the auxiliary bolt operates in such a manner that when the door is open it automatically retains the guard tumbler in unlocked position so the bolt may be shot to and fro with the renter's key alone, but after the renter closes the door and shoots the main bolt home, the auxiliary bolt moves to allow the guard tumbler to return to locked position, so that subsequent unlocking of the door requires joint application of the two keys.

Figure 11:
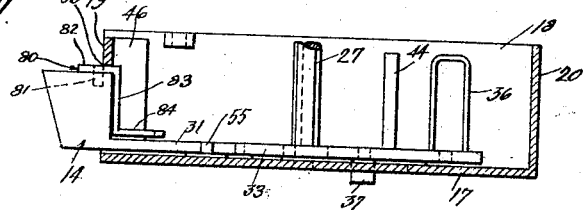
Fig. 11 is a section on line 11—11 of Fig. 10.

In the present embodiment of the invention the auxiliary bolt consists of a lever 80 pivoted to bolt 14 at 81 and having an arm 82 lying adjacent the outer face of said main bolt. Lever 80 also has a depending extension 83 (Fig. 11) which brings lever arm 84 into the plane of guard tumbler 40, and the end of arm 84 terminates in a hook 85. Lever 80 extends through a suitable aperture 86 in casing wall 19, and a flat spring 87 on this lever is adapted to coact with pin 88 on bolt 14 to yieldably rotate the lever in a counter-clockwise direction. Guard tumbler 40 has a notch 89 formed in its lower edge and laterally defined by lugs 54 and 90.

Figure 12:
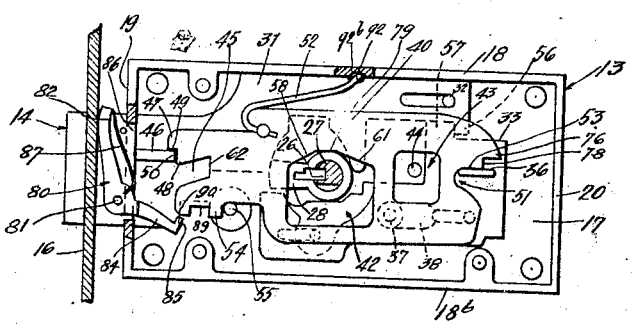
Fig. 12 is a view similar to Fig. 10 but showing the guard tumbler in locking position.

When the door is closed and the main bolt shot to locked position as in Figures 1 and 12, it will be noted that arm 82 of lever 80 engages keeper 16 at one side of the bolt aperture 15 and this engagement causes the retention of arm 84 in such a position that hook 85 is out of operative engagement with the guard tumbler. To unlock the door the guard key 41 and main key 91 are simultaneously entered in the key post slot 26 which is of sufficient width to accommodate both keys at once. For the time being we will disregard the peculiarities of the lock and key which compel the entry and withdrawal of the keys in certain sequence and will merely assume that both keys are capable of being simultaneously thrust into the lock. As key post 27 is initially turned in a clockwise direction the guard key raises the guard tumbler to unlocked position, and the main key raises the main tumblers to unlocked position. Further rotation of the key post causes retraction of the main bolt by reason of the key post cam engaging tail piece shoulder 73. This places the lock in the condition of Figs. 13 and 17, and, as pointed out above, it will be seen that since the guard tumbler is responsive only to the guard key, and the main tumblers are responsive only to a particular main key, it is necessary that both be in operative position within the lock before the bolt can be retracted, and since the guard key is unable to move the guard tumbler to hold it in unlocked position, the main key must retract the bolt while the guard key is holding its notch 45 in register with stump 46.

Figure 13:
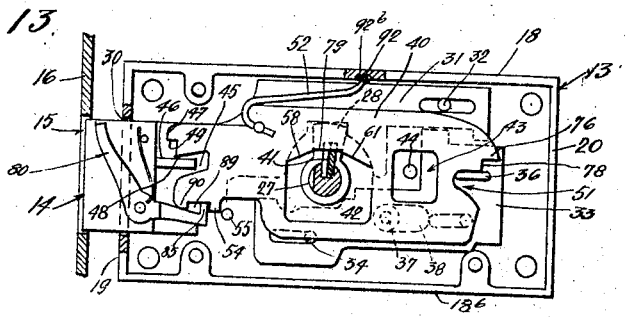
Fig. 13 is a view similar to Fig. 12 but showing the bolt partially retracted.

To discuss the action of the auxiliary bolt on the guard tumbler it is unnecessary to consider the position of the main tumblers and therefore Figures 12, 13 and 14 illustrate the bolt mechanism with the main tumblers omitted. As bolt 14 (Fig. 12) is retracted by movement of the key post cam 28, spring 87 acts, by reason of pivot point 81 moving inwardly with the main bolt, to rotate lever 80 in a counter-clockwise direction, moving tongue or catch 85 into the guard tumbler notch 89, as shown in Figure 13. Now assume that the door be opened and the key post be turned back to original position in order that the renter and guard may withdraw their keys. This means that the bolt must be shot to full extended position so as to bring post slot 26 in register with notch 24. However, since keeper 16 no longer lies in the path of auxiliary bolt 80, spring 87 continues to hold bolt 80 in the position of Figures 13 and 14. The extent of tumbler notch 89 is such that while the main bolt is moving to extended position, catch 85 engages lug 90 before the main bolt is fully extended and therefore draws guard lug 40 to the left in Figure 13 during the last part of main bolt extension. This longitudinal movement of guard tumbler 40 prevents riding nose 48 from leaving stump 46 and thus the guard tumbler is held elevated in clear position while the main tumblers are returned to locking position. It is evident that the main bolt may thereafter be thrown to and fro by actuation of the key post through the main key only, thus allowing the renter to relock his box without calling for joint action of the guard key. Before the door be closed it is necessary that the renter first fully retract the bolt by use of his key, and in so doing, it still being borne in mind that tongue 85 is in notch 89, tongue 85 engages guard tumbler lug 54 during the last part of bolt retraction and moves the guard tumbler back to the right. Now, if the bolt be again extended with the door open, tongue 85 still functions, on the extension stroke of the main bolt, to retain nose 48 on stump 46 and thus maintain the guard tumbler in clear position. However, when the door is closed and the main bolt shot home by the main key, whether or not the guard key be also in the key post, arm 82 engages keeper 16 before the main bolt is fully extended, and lever 80 is thereby rotated in a clockwise direction to release hook 85 from slot 89. The guard tumbler 40 is thus left in normal condition, as regards its longitudinal position, and consequently when the main bolt reaches its position of full extension guard tumbler 40 is free to be urged downwardly by spring 52 and thrust into locking position.

In lieu of utilizing the engagement of hook 85 with lug 54 for thrusting the guard tumbler back to normal position during main bolt retraction after and immediately preceding bolt extension with the door open, notch 45 may be sufficiently shallow to bring shoulder 62 in the path of stump 46 during main bolt retraction, so said stump, in its engagement with said shoulder, moves the guard tumbler back to normal. In such a case, notch 89 will be of such an extent that hook 85 is incapable of engaging lug 54.

When the combination is to be changed, the following procedure is followed. The bolt is first retracted by the use of the two keys, as described above, and the door opened. The guard and main tumblers will then be in the position shown in Fig. 17, except that bolt 14 will be at the limit of its retracted movement rather than in the partially retracted position shown in this figure. With the bolt tail piece 31 at the extreme limit of its retractive movement, lug 56 is entirely clear of slide plate lug 57. The slide plate 33 is then moved to the right as viewed in the various figures, by manual manipulation of pin 37, carrying with it the rack post 36. The post is moved a sufficient distance to clear it from the combination notches 68, 69 and 70 of the various main tumblers and from notch 51 of the guard tumbler. Consequently, both guard and main tumblers are swung downwardly by springs 52 and 71 about noses 48 and 48$^b$ as centers. They are caught and supported by the engagement of tumbler racking noses 76 with racking post 36, the latter being limited in its longitudinal movement to such an extent that it cannot be brought clear of said racking noses. Thus all the tumblers, irrespective of their previous relative positions, and irrespective of which combination notches were entered by the racking post, are dropped and held in a common, neutral position, this position being such that shoulders 72 of the main tumblers clear the key post by a small margin. Slide plate 33, in its movement to the right, withdraws shoulder 75 from beneath key position cam 28. Therefore, the key post may be further rotated in a clockwise direction to bring the key post slot 26 into register with nose notch 25, whereupon the keys are withdrawn from the lock.

Then the guard key and the new main key are entered through notch 25 and are rotated in a counter-clockwise direction. In its rotation the guard key ward 41$^b$ engages cam face 61 of the guard tumbler, raising the rear end of said tumbler so its notch 51 is in alinement with rack post 36. At the same time, the various wards of the main key pick up their corresponding tumblers, and when the keys have reached a position approximately midway between their extremes, key post cam 28 engages tail shoulder 74 and moves the bolt to the left. This movement of the bolt causes longitudinal movement of slide plate 33 due to the coaction between tail piece lug 56 and slide plate lug 57, and consequently racking post 36 is drawn to the left and enters those combination notches of the main tumblers which are now in alinement with said post, thus setting the tumblers to the new main key due to the fact that the tumblers are at their uppermost position, as determined by the individual key wards associated therewith, at the time of racking post entry to the notches. Since the guard tumbler may not be raised to bring notch 51 into line with post 36 except with the use of the guard key, the main key, by itself may not be used to set the main tumblers up to the new combination for the following reason. The shoulder 78 beneath the racking nose 76 of the guard tumbler would still engage racking post 36, and if plate 33 were moved to the left by the engagement of lugs 56 and 57 through main key actuation, tumbler 40 would also be carried to the left. The guard tumbler would then engage pin 44 to prevent full movement of plate 33 to the left and hence would prevent full main bolt extension, and such extension is necessary to set the main tumblers to the new combination and to allow key withdrawal through notch 24.

With the use of both keys, however, all tumblers are first raised to bring their respective rearward notches into alinement with racking post 36, whereupon slide plate 33 and bolt 14 are free to move to their full extended position upon a counter-clockwise rotation of the key post, the new combination being set up during the period of this movement as previously described, slide plate 33 being moved to draw racking post 36 into the registering notches of the various tumblers. Thus it is evident that it is necessary that the guard and main key be jointly and simultaneously applied to set up a new combination, thus eliminating the danger of the lock being left in such a condition that any main key, by itself, may set up a new combination after a preceding, independent guard key actuation.

It will be understood it lies within the scope of my invention to vary the form and mounting of the auxiliary bolt within certain limits. For instance, flat spring 87 may be supplanted by a coil spring about pivot 81, or arm 82 may be a straight thrust bolt mounted within main bolt 14 and adapted to project beyond the end of said main bolt when the door is open and brought flush with said end when the bolt is seated in its keeper, the movement of said auxiliary bolt being transmitted to a catch arm similar to arm 84 by any suitable connecting means such as a link.

I will now describe my preferred method of forcing a predetermined sequence in the withdrawal of the keys whereby the guard is forced to stay by the compartment until the renter has removed his key from the lock. It will be noted by reference to Figure 3 that while the key receiving slot 26 in post 27 is of sufficient width to accommodate the two keys, side by side, notches 24 and 25 in the nose flange are only of a width to admit the keys one at a time. Thus one key must be inserted through notch 24 and moved laterally through the key post slot and beneath the overhang of the nose flange before notch 24 is clear to admit the other key. In order that the guard key necessarily be the last withdrawn, and conversely the first inserted, I have formed the key receiving slot 93 in key post cam 28 as illustrated in Figure 7. The portion of this slot which is in alinement with key post slot 26 is of a width sufficient to admit the two keys but the body of the cam projects into slot 93 at 94 to restrict the height of one-half of slot 93 with respect to the other half. Thus, slot portion 95 is relatively long and slot portion 96 is relatively short. The first ward 41$^b$ of guard key 41 is so located that when the key is in operative position within the key post and within slot portion 96 of cam 28, said ward lies at one side of projection 94. On the other hand, the first ward 98 of main key 91 is so located that when said key is in operative position the ward lies in the plane of cam 28 and projection 94. Therefore to place said main key in operative position it is necessary that ward 98 lie within the relatively long slot portion 95. Thus projection 94 prevents the main key from being first inserted and moved bodily in such a manner that it clears the slot for subsequent insertion of the guard key, for, with ward 98 in end engagement with projection 94, the main key may not be thrust inwardly a sufficient distance to bring retention notch 99 in register with nose flange 23, and such register is necessary to allow the handle end of the key to be moved laterally through slot 26 sufficiently to admit the guard key. In Figure 8 I have shown the main key 91 as being inserted to its operative position with respect to the key post prior to the insertion of the guard key, and in which position ward 98 lies within cam slot portion 95, and retention slot 99 is in register with the nose notch 24. However, since projection 94 engages the side of ward 98 to hold the inner end of the key from lateral movement, an attempt to move the key laterally in a manner to clear notch 24 merely results in an inclination of said key as shown in this figure. This leaves a wedge shaped opening at one side of the main key, and, of course, it is impossible to insert the guard key through such a passageway. On the other hand, with the main key in this position and with the guard tumbler in unlocked position due to a previous joint key action, key 91 is competent to actuate the main tumblers, turn the key post and reciprocate the main bolt.

In order to show that the invention, in its broader aspects may be applied to a single nose lock wherein there are two separate key receiving slots, I have illustrated a modified key post in Figures 19 and 20. Nose 100 has the two notches 101 and 102, while key post 103 has key receiving slots 104 and 105 separated by a web 106. Slot 105 is of sufficient width to allow bodily transverse movement of guard key 107. Notch 102, however is only of a width to admit guard key 107. In web slot 108 is a slide block 109 having cam inclines 110 on its outermost ends. This block is free to slide through the web so as to project into either slot 104 or 105. Now if main key 111 be inserted prior to guard key 107, block 109 will be forced across slot 105 by said key, thus preventing subsequent insertion of the guard key. However, with the guard key first inserted within slot 105, when main key 111 is inserted in its particular slot, block 109 engages the guard key and moves it laterally to the position of Fig. 19, both keys then being in operative position. Due to the restricted extent of notch 102, the guard key cannot be withdrawn from the key post until key 111 has first been removed to allow transverse movement of block 109, whereupon guard key 107 may be moved transversely to bring it in register with withdrawal notch 102.

In Figure 9 I have shown a modified type of main key 112, said key being so constructed that, in its coaction with the guard key, sequential key withdrawal is forced. With this modified type of key in use, the peculiarly shaped slot in the key post cam and a restricted nose notch need not be provided. It will be noted that main key 112 has a shoulder 113 near its handle end. Both the slot in the key post and the notch in the nose flange may be of a width to simultaneously admit the two keys, though preferably the guard key will be the first inserted. When the two keys are in operative position they will be associated as shown in Figure 9, that is, shoulder 113 will be in engagement with shoulder 114 of the guard key. It is self evident that shoulder 113 prevents withdrawal of guard key 41 while said main key is in the lock.

While I have shown and described specific embodiments of my invention I wish to make the reservation that this showing and description are to be considered merely as illustrative of and not restrictive on the broader claims appended hereto, for certain changes in structure, design and arrangement may be made without departing from the spirit and scope of these claims.

I claim:

1. In a single nose lock, a bolt adapted to be operated jointly by two keys which are both insertable through the single nose, and means on the nose adapted to prevent withdrawal of one of the keys from the lock while the other key is in the lock.

2. In a single nose lock, a bolt adapted to be retracted by simultaneous operation of two keys which are both insertable through the single nose to bring their operating portions into a position of mutual over-lap, and means on the nose adapted to prevent withdrawal of the keys from the lock except in predetermined sequence.

3. In a single nose lock, a bolt adapted to be operated jointly by two keys which are both insertable through the single nose, and means to prevent withdrawal movement of one of the keys from the lock until the other key is completely removed from the lock.

4. In a single nose lock, a bolt adapted to be retracted by simultaneous operation of two keys which are both insertable through the single nose to bring their operating portions into mutually over-lapping positions, and means on the nose adapted to prevent insertion and withdrawal of the keys through the nose except in sequence.

5. In a single nose lock, a key post, and a bolt operatively connected to the post and adapted to be operated jointly and simultaneously by two keys which are both insertable through the single nose, said key post having a slot adapted to accommodate simultaneously both keys with their operating portions in mutally over-lapping relation, said lock nose having a notch of a width which will accommodate the keys only one at a time.

6. In a single nose lock adapted to be operated jointly by two keys, a bolt, a lock nose, a rotatable key post in the nose, and a cam on the post operatively connecting it to the bolt, said key post having a key-receiving slot of a width to accommodate both keys simultaneously and being adapted to register intermittently with a key admitting notch in the nose during rotation of the key post, said notch being of a width to accommodate the keys only one at a time; the key post cam having a key-receiving slot in alinement with and opening to the key post slot and having a portion of a width to take both keys and another portion of a width to take only one key, said last-named portion being in alinement with the nose notch when the bolt is fully extended.

7. In a single nose lock, a casing, a bolt in the casing and adapted to be operated jointly by two keys, a rotatable key post for the lock and having a single slot adapted to accommodate the two keys in side by side relation, the casing having a key admitting notch adapted to intermittently register with the key post slot during key post rotation, the notch and slot being of such shape that, when they are in register, they form an irregular opening which will receive but one key at a time.

8. In a single nose lock, a bolt adapted to be operated jointly by two keys which are adapted to be simultaneously accommodated by the lock, means to prevent the operative insertion of one key when the other key is in the lock but allowing the operative insertion of said other key when said one key is in the lock, and means on the nose adapted to prevent withdrawal of said one key when said other key is in the lock.

9. In a lock, a bolt, a key post operatively connected to the bolt and adapted to be operated jointly by two keys simultaneously accommodated in side by side relation by the key post, one of said keys being insertable to operative position when the other key is in operative position within the post, and means on the post and said one key adapted to coact in a manner to prevent insertion of said other key to an operative position when said one key is in operative position.

10. In a lock, a bolt, a key post operatively connected to the bolt and adapted to be operated jointly by two keys simultaneously accommodated in side by side relation by the key post, one of said keys being insertable to operative position when the other key is in operative position within the post, means on the post and said one key adapted to coact in a manner to prevent insertion of said other key to an operative position when said one key is in operative position; and means to prevent the withdrawal of said other key when said one key is in the post.

11. In a lock having a single key post adapted to accommodate two keys, a bolt operatively connected to the key post and adapted to cooperate with a keeper and to be retracted by simultaneous operation of the two keys when it is in engagement with the keeper, and to be retracted by operation of one key when it is out of engagement with the keeper; and means to prevent withdrawal of one of the keys from the lock when the other key is in the lock.

12. In combination, a casing, a door for the casing, a lock for the door and embodying a bolt adapted to be moved into and out of engagement with the casing, a tumbler capable of both longitudinal and lateral movement, said tumbler being adapted to hold the bolt extended into engagement with the casing when the door is closed and to be laterally moved by a key to allow retraction of the bolt from engagement with the casing, and means in the lock adapted to move the tumbler longitudinally into a position to allow reciprocation of the bolt when the door is open.

13. In combination, a casing, a door for the casing, a lock for the door and embodying a bolt adapted to be moved into and out of engagement with the casing, a tumbler capable of both longitudinal and lateral movement, said tumbler being adapted to hold the bolt extended into engagement with the casing when the door is closed and to be laterally moved by a key to allow retraction of the bolt from engagement with the casing, and means on the bolt adapted to move the tumbler longitudinally into a position to allow reciprocation of the bolt when the door is open.

14. In combination, a door, a keeper, a bolt adapted to engage the keeper, a tumbler capable of longitudinal movement, a movable catch on the bolt and adapted to operatively engage the tumbler and move it longitudinally during the extension movement of the bolt when the door is open, a spring adapted to move the catch into operative engagement with the tumbler when the bolt is retracted from engagement with the keeper, said catch being adapted to engage the keeper and to be moved thereby out of operative engagement with the tumbler when the door is closed.

15. In combination with a keeper, a door lock including a bolt, a tumbler capable of both longitudinal and lateral movement, said tumbler being adapted to be moved laterally by a key to allow bolt retraction, and means in the lock and detachably connected to the tumbler adapted to move the tumbler longitudinally into a position to allow reciprocation of the bolt when the door is open and after withdrawal of said key, said means being adapted to coact with the keeper and to be thereby moved out of connection with the tumbler when the door is closed.

16. In combination, a door, a keeper, a bolt adapted to engage the keeper, a tumbler capable of longitudinal movement, a movable catch on the bolt and adapted to operatively engage the tumbler and move it longitudinally during the extension movement of the bolt when the door is open, said catch being adapted to engage the keeper and to be moved thereby out of operative engagement with the tumbler when the door is closed.

17. In combination, a door, a keeper, a bolt adapted to engage the keeper, a tumbler, a catch member pivotally mounted on the bolt, means to move the catch member into operative engagement with the tumbler when the door is open, and means to move the catch member out of operative engagement with the tumbler when the door is closed.

18. In combination with a keeper, a door, a door lock including a bolt, a plurality of tumblers adapted to be actuated by two keys when the door is closed, certain of said tumblers being main tumblers and responsive only to one of the keys, another of said tublers being a guard tumbler and responsive only to the other key, said guard tumbler being capable of longitudinal movement into a position to allow bolt reciprocation when the door is open, and a movable catch on the bolt and adapted to operatively engage the guard tumbler and move it longitudinally during longitudinal movement of the bolt when the door is open, said catch being adapted to engage the keeper and to be moved thereby out of operative engagement with the tumbler when the door is closed.

19. In combination with a keeper, a door, a door lock including a bolt, a plurality of tumblers adapted to be actuated by two keys when the door is closed, certain of said tumblers being main tumblers and responsive only to one of the keys, another of said tumblers being a guard tumbler and responsive only to the other key, said guard tumbler being capable of longitudinal movement into a position to allow bolt reciprocation when the door is open, a movable catch on the bolt and adapted to operatively engage the guard tumbler and move it longitudinally during longitudinal movement of the bolt when the door is open, said catch being adapted to engage the keeper and to be moved thereby out of operative engagement with the tumbler when the door is closed and means to prevent withdrawal of one of the keys from the lock while the other key is in the lock.

20. In combination, a door, a keeper, a bolt adapted to engage the keeper, and means for operating the bolt and including a single key post adapted to receive two keys at once and requiring both keys for actuation when the door is closed and one key when the door is open.

21. In combination, a door, a keeper, a bolt adapted to engage the keeper, means for operating the bolt and including a single key post adapted to receive two keys at once and requiring both keys for actuation when the door is closed and one key when the door is open, and means to prevent withdrawal of one of the keys from the lock while the other key is in the lock.

22. In an interchangeable key lock, a bolt, means for operating the bolt requiring two keys for actuation, and means for resetting the combination of the lock by the simultaneous actuation of two keys.

23. In an interchangeable key lock, a bolt, means for operating the bolt requiring two keys for actuation, and means for resetting the combination of the lock and requiring the simultaneous actuation of two keys for operation.

24. In an interchangeable key lock, a bolt, means for operating the bolt requiring two keys for actuation, means for resetting the combination of the lock by the simultaneous actuation of two keys, and means to prevent withdrawal of one of the keys from the lock when the other key is in the lock.

25. In an interchangeable key lock, a bolt, a nose, a key post operatively connected to the bolt and adapted to be actuated jointly and simultaneously by two keys, said post being rotatable within the nose to a plurality of positions which admit of key insertion to and withdrawal from the post through the nose, and means on the nose adapted to prevent withdrawal of one of the keys while the other key is in the lock when the post is in any one of said positions.

26. In combination with a keeper, a door, an interchangeable key lock on the door, said lock including a bolt adapted to engage the keeper, means for operating the bolt requiring two keys for actuation when the door is closed and one key when the door is open; and means for resetting the combination of the lock by the simultaneous actuation of two keys.

27. In combination with a keeper, a door, an interchangeable key lock on the door, said lock including a bolt adapted to engage the keeper, means for operating the bolt requiring two keys for actuation when the door is closed and one key when the door is open; and means for resetting the combination of the lock and requiring the simultaneous actuation of two keys for operation.

In witness that I claim the foregoing I have hereunto subscribed my name this 21st day of March 1924.

GEORGE B. VARNUM.